Patented Aug. 30, 1938

2,128,699

UNITED STATES PATENT OFFICE 2,128,699

SEPARATION OF NITRANILINES

Robert Frye, Chicago, Ill., assignor to The Sherwin-Williams Company, Cleveland, Ohio, a corporation of Ohio No Drawing. Application May 18, 1936, Serial No. 80,414

10 Claims. (Cl. 260—582)

The present invention relates to the manufacture and separation of ortho and para nitraniline.

The usual procedure for preparing para nitraniline from para nitro chlor benzol is to purify a mixture of ortho and para nitro chlor benzol in order to provide a high grade isomer para nitraniline. Then this isomer is treated by a suitable ammonolysis process whereby the chlorine substituent reacts with ammonia leaving an amino substituent in the benzene ring at the place where the chlorine has been removed. There are many disadvantages in the above process, particularly in making the separation of the ortho and para isomers before ammonolysis.

By the present invention the mixed isomers are left together and both are converted to amines by ammonolysis, and the ortho and para isomers of the resulting ortho and para nitranilines are then separated. The present invention is based upon discovery of a method of readily separating these isomers. It thus becomes more practical to convert both isomers of the nitro chlor benzol into the nitranilines, even though there may be no particular use for the ortho nitraniline thus formed.

In particular it has been discovered that an aqueous solution of caustic alkali, such as sodium or potassium hydroxide, at a temperature above the melting point (71.5° C.) of the lower-melting isomer ortho nitraniline has the power readily to dissolve the ortho isomer, and does not appreciably dissolve the para isomer unless the temperature is above about 80° C., very little being dissolved up to about 85° C. This temperature of 80° C. to 85° C., where the para isomer begins to dissolve is considerably below the melting point (148° C.) of the pure para isomer. This difference in properties between the two isomers in a narrow range of temperature makes it very simple to effect their separation, and hence to provide a new procedure for the commercial preparation of either of them. Since the ortho nitraniline at present has relatively less commercial value than the para nitraniline the present invention will be described with particular reference to the latter.

A mixture of ortho and para nitro chlor benzol is commonly available wherein there is about 65% of the para isomer and about 35% of the ortho isomer. The proportion of the isomers is not critical for the invention in any way, but relates only to the economics of using the invention, and the uses of the products. Any mixture of these isomers may be treated by any process of ammonolysis, of which many variations are known, to form the two isomeric nitranilines. To this point, the prior separation of the nitro chlor benzols is avoided.

The mixture of nitranilines may be in any form. The two isomers may be separate crystals or they may be together in solid solution, or even in melted form, it being understood that mixtures of the two melt considerably below the higher melting point of the pure para nitraniline. Practically, the isomers to be separated may be provided in the form of a filter cake from an ammonolysis process.

The mixed isomers are added to a caustic alkali solution and the temperature is maintained for a time between about 72° C. and preferably about 80° C. to effect solution of the ortho nitraniline in the caustic. The time necessary for this will vary according to the form of the mixed isomers employed. The extraction mass may be heated to above 80° C. but above this temperature some of the para isomer will go into solution. The higher the temperature the more this occurs. Because the solubility of the para nitraniline begins at about 80° C. and increases with increase in temperature, the upper limit is variable according to the desired or permissible sharpness of separation. Up to 85° C. it is sufficiently insoluble to permit working practically up to that temperature, but preferably the upper limit is about 80° C., although the practical limit is about 85° C. for certain commercial uses. The higher this temperature, the more the resulting ortho nitraniline is impure with the para isomer, and the lower the yield of the para isomer.

The nitraniline may all be melted in the caustic solution to hasten the dissolution of the ortho isomer, but the mass must be cooled to the limited range and time be permitted for the para isomer to come out of the caustic solution. The dissolved ortho isomer is then separated from the undissolved para isomer by filtering or other equivalent separation. The para nitraniline may remain as a mushy mass of crystals.

The strength of the caustic solution is not critical. A strong solution involves less volume, but entails also dangers to workers, and especially difficulties in filtering. A weaker solution increases the volume of caustic solution required. Therefore, a concentration is chosen which produces balanced advantages and disadvantages, or according to preference. A preferred caustic solution is one containing 6% caustic soda. The process is readily workable with concentrations as strong as 10% and as weak as 3%, but beyond these limits the process is less practical, yet still workable.

In practice, for every 100 kilograms of mixed ortho and para nitraniline, such as filter cake having about 65% of the para isomer and about 35% of the ortho isomer there is used about 400 liters of 6% caustic soda solution. This is heated to above 71.5° C. for from 1 to four hours with agitation. If the temperature during this period is not over about 80° C. to 85° C. the required separation is effected preferably while the caustic solution is at a temperature between 71.5° C. and about 80° C., but it may be effected up to about 85° C. If the temperature has gone over 85° C. during the extraction it is allowed to stay at the preferred filtering range of 71.5° C. to 80° C., or even up to 85° C., for a short time before filtering.

The separation may be carried out by any suitable means, preferably through paper, for which the hot caustic solution of 6% is not unsatisfactory. The para nitraniline remains on the filter. The ortho nitraniline passes through the filter with the caustic and on cooling of the filtrate below 71.5° C. the ortho nitraniline crystallizes out. This may then be filtered from the caustic solution, permitting recovery of both caustic solution and of ortho nitraniline.

There may be present impurities or small amounts of materials other than the ortho and para isomers mentioned. These may be related to recovery of caustic solution for reuse in the process. Without impurities the caustic solution is theoretically suitable for reuse. Waste may be supplied by using additional hot caustic solution within the critical temperature range, as a wash for the para nitraniline in the filter.

In practice considerable extra washing caustic solution may be used so that some of the recovered caustic may be discarded. Thus impurities in the caustic filtrate are not cumulative in the process. It is known that some processes of ammonolysis may produce some secondary amines in addition to the desired ortho and para primary amines. These and other impurities may be soluble in the caustic solution and thus be removed from both the ortho nitraniline and the para nitraniline.

In the case of each isomer on the filter the caustic may be washed out with water, or the filter cake treated in any desired manner. The yield from para nitro chlor benzol by the described process is from 87% to 90%, where the ammonolysis process is 91% to 93% efficient in producing the para nitraniline, and where the preferred limit of 80° C. is observed.

The procedure may be modified to reduce the volume of caustic solution employed by making the process a continuous extraction one. Hot caustic solution within the range 71.5° C. to 80° C. or 85° C., may be used as an extraction or leaching agent for the mixed isomers. The leaching agent may then be cooled to throw out the ortho isomer, and filtered, the filtrate reheated to the extracting temperature, and used to continue the leaching process.

The invention therefore resides in the power of hot aqueous caustic alkali solution to dissolve ortho nitraniline at temperatures above about 71.5° C., to dissolve little or no para nitraniline at temperatures below about 80° C., and to dissolve but little para nitraniline between about 80° C. and about 85° C.

I claim:

1. The process of making para nitraniline relatively free from ortho nitraniline which comprises treating a mixture of ortho and para nitro chlor benzol to ammonolysis whereby to form the mixed isomers ortho and para nitraniline, subjecting the mixed isomers to the action of an aqueous caustic alkali solution at a temperature above 71.5° C. and below the decomposing temperature of said isomers whereby the caustic solution dissolves ortho nitraniline, separating the solid undissolved matter and the caustic solution at a temperature in the range between 71.5° C. and 80° C., in which range para nitraniline is substantially insoluble in the caustic solution.

2. The method of separating mixed isomers of ortho and para nitraniline which comprises subjecting the mixed isomers to the action of aqueous caustic alkali solution at a temperature above 71.5° C. and below the decomposing temperature of said isomers whereby to dissolve the ortho isomer, and separating the undissolved solid and the caustic alkali solution at a temperature in the range between 71.5° C. and 80° C., in which range the ortho isomer is soluble and the para isomer insoluble.

3. The method of separating mixed isomers of ortho and para nitraniline which comprises subjecting the mixed isomers to the action of aqueous caustic alkali solution at a temperature below the decomposition temperature of said isomers and above 80° C., above which temperature the ortho isomer is completely soluble and the last-mentioned para isomer is capable of solution in the caustic alkali solution, maintaining the caustic alkali solution at a temperature in the range between 71.5° C. and 80° C. in which range the ortho isomer is soluble and the para isomer is substantially insoluble, and separating the solid para isomer from the caustic alkali solution in said range of temperature.

4. The method of separating mixed isomers of ortho and para nitraniline which comprises subjecting the mixed isomers to the extracting action of an aqueous caustic alkali solution at a temperature in the range between 71.5° C. and 80° C., in which range the ortho isomer is soluble and the para isomer is substantially insoluble.

5. The method of separating mixed isomers of ortho and para nitraniline which comprises subjecting the mixed isomers to the extracting action of an aqueous caustic soda solution of about 6% strength at a temperature in the range between 71.5° C. and 80° C., in which range the ortho isomer is soluble and the para isomer is substantially insoluble, and separating the undissolved para isomer from the solution of the ortho isomer.

6. The process of making para nitraniline relatively free from ortho nitraniline which comprises treating a mixture of ortho and para nitro chlor benzol to ammonolysis whereby to form the mixed isomers ortho and para nitraniline, subjecting the mixed isomers to the action of an aqueous caustic alkali solution at a temperature above 71.5° C. and below the decomposing temperature of said isomers wherby the caustic solution dissolves ortho nitraniline, separating the solid undissolved matter and the caustic solution at a temperature in the range between 71.5° C. and 85° C., at which upper limit of temperature the para nitraniline is but slightly soluble in the caustic alkali solution.

7. The method of separating mixed isomers of ortho and para nitraniline which comprises subjecting the mixed isomers to the action of aqueous caustic alkali solution at a temperature above 71.5° C. and below the decomposing temperature of said isomers whereby to dissolve the ortho isomer, and separating the undissolved solid and the caustic alkali solution at a temperature in the range between 71.5° C. and 85° C., at which upper limit of temperature the para isomer is but slightly soluble, while the ortho isomer in the said range of temperature is soluble, in the caustic alkali solution.

8. The method of separating mixed isomers of ortho and para nitraniline which comprises subjecting the mixed isomers to the action of aqueous caustic alkali solution at a temperature above 85° C., above which last-mentioned temperature below the decomposition temperature of said isomers and the ortho isomer is completely soluble and the para isomer is slightly soluble in the caustic alkali solution, maintaining the caustic alkali solution at a temperature in the range between 71.5° C. and 85° C., in which range the ortho isomer is soluble and the para isomer but slightly soluble, and separating the solid para isomer from the caustic alkali solution in the said range of temperature.

9. The method of separating mixed isomers of ortho and para nitraniline which comprises subjecting the mixed isomers to the extracting action of an aqueous caustic alkali solution at a temperature in the range between 71.5° C. and 85° C. in which range the ortho isomer is soluble and the para isomer but slightly soluble.

10. The method of separating mixed isomers of ortho and para nitraniline which comprises subjecting the mixed isomers to the extracting action of an aqueous caustic soda solution of about 6% strength at a temperature in the range between 71.5° C. and 85° C. in which range the ortho and isomer is soluble and the para isomer but slightly soluble.

ROBERT FRYE.

CERTIFICATE OF CORRECTION.

Patent No. 2,128,699. August 30, 1938.

ROBERT FRYE.

It is hereby certified that error appears in the printed specification of the above numbered patent requiring correction as follows: Page 2, second column, line 31-32, claim 3, strike out "last-mentioned" and insert the same after "which" in line 30, same claim; line 65, claim 6, for "wherby" read whereby; page 3, first column, lines 15, 16 and 17, claim 8, strike out the words "below the decomposition temperature of said isomers and" and insert the same after "temperature" in line 14, same claim; and that the said Letters Patent should be read with this correction therein that the same may conform to the record of the case in the Patent Office.

Signed and sealed this 15th day of November, A. D. 1938.

Henry Van Arsdale (Seal) Acting Commissioner of Patents.